「12」 United States Patent
Basu et al.

(10) Patent No.: US 10,282,709 B2
(45) Date of Patent: May 7, 2019

(54) PROCESSOR ISSUER DETECTION AND USER LEVEL STAND-IN AUTHORIZATION (71) Applicant: Visa International Service Association, San Francisco, CA (US)

(72) Inventors: Gourab Basu, Half Moon Bay, CA (US); Steven Cracknell, San Mateo, CA (US); Michael Mori, San Mateo, CA (US)

(73) Assignee: Visa International Service Association, San Francisco, CA (US)

( * ) Notice: Subject to any disclaimer, the term of this patent is extended or adjusted under 35 U.S.C. 154(b) by 323 days.

(21) Appl. No.: 14/247,032

(22) Filed: Apr. 7, 2014

(65) Prior Publication Data

US 2014/0304158 A1 Oct. 9, 2014

Related U.S. Application Data (60) Provisional application No. 61/808,836, filed on Apr. 5, 2013.

(51) Int. Cl.
*G06Q 20/02* (2012.01)
*G06Q 20/34* (2012.01)
*G06Q 20/40* (2012.01)

(52) U.S. Cl.
CPC .......... *G06Q 20/02* (2013.01); *G06Q 20/34* (2013.01); *G06Q 20/4016* (2013.01)

(58) Field of Classification Search
CPC .................................................. G06Q 20/02
See application file for complete search history.

(56) References Cited

U.S. PATENT DOCUMENTS

| 7,809,650 | B2 | 10/2010 | Bruesewitz et al. |
| 8,069,084 | B2* | 11/2011 | Mackouse ............. G06Q 20/10 705/17 |
| 8,280,776 | B2* | 10/2012 | Coulter ................. G06Q 20/02 235/380 |
| 8,401,904 | B1* | 3/2013 | Simakov ............ G06Q 20/3572 705/16 |
| 8,600,873 | B2* | 12/2013 | Fisher ................ G06Q 10/0635 705/35 |
| 2008/0021787 | A1* | 1/2008 | Mackouse ............. G06Q 20/10 705/17 |
| 2009/0106151 | A1 | 4/2009 | Nelsen et al. |
| 2009/0307135 | A1* | 12/2009 | Gupta .................. G06Q 20/085 705/44 |
| 2010/0017328 | A1 | 1/2010 | Stephen et al. |
| 2011/0184782 | A1* | 7/2011 | Delany ................. G06Q 10/06 705/7.37 |
| 2012/0036073 | A1 | 2/2012 | Basu et al. |
| 2012/0101930 | A1* | 4/2012 | Li ......................... G06Q 40/02 705/35 |

(Continued)

*Primary Examiner* — Kirsten S Apple
*Assistant Examiner* — Martin A Gottschalk
(74) *Attorney, Agent, or Firm* — Kilpatrick Townsend & Stockton LLP (57) ABSTRACT

Embodiments of the invention are directed to systems and methods for stand-in processing using data driven capabilities. Transaction activity of an issuer may be monitored to detect a major incident and to automatically invoke stand-in processing. By modeling each individual account holder's behavior, improved authorization outcomes may be provided by a payment processing network during stand-in processing.

20 Claims, 5 Drawing Sheets

(56) References Cited

U.S. PATENT DOCUMENTS

| | | | |
|---|---|---|---|
| 2012/0109822 A1* | 5/2012 | Mackouse | G06Q 20/10 705/44 |
| 2013/0013514 A1* | 1/2013 | Mackouse | G06Q 20/10 705/44 |
| 2013/0080328 A1* | 3/2013 | Royyuru | G06Q 40/02 705/44 |
| 2013/0179176 A1* | 7/2013 | Gotthardt | G06F 19/345 705/2 |
| 2013/0254054 A1* | 9/2013 | Diehl | G06Q 20/02 705/21 |
| 2014/0074631 A1* | 3/2014 | Grossman | G06Q 20/0453 705/16 |
| 2014/0089072 A1* | 3/2014 | Freund | G06Q 30/0631 705/14.27 |
| 2015/0019401 A1* | 1/2015 | Kollur | G06Q 40/025 705/38 |
| 2015/0170072 A1* | 6/2015 | Grant | G06Q 10/067 705/7.36 |

\* cited by examiner

PROCESSOR ISSUER DETECTION AND USER LEVEL STAND-IN AUTHORIZATION

CROSS-REFERENCES TO RELATED APPLICATIONS

This application is a non-provisional application of and claims the benefit of priority of U.S. Provisional Application No. 61/808,836 entitled "Processor Issuer Detection and User Level Stand-In Authorization" filed on Apr. 5, 2013, which is herein incorporated by reference in its entirety for all purposes.

BACKGROUND

In a typical transaction flow, when a user provides a payment account number to a merchant to make a payment for a transaction, the merchant checks with an issuer of the payment account for authorization. In some instances, the issuer may malfunction or fail to respond to the authorization request for the transaction. In such cases, an entity may perform stand-in processing to authorize the transaction on behalf of the issuer. Typical solutions to make authorization decisions on behalf of the issuer are broad based and in most cases may depend upon the issuer's preconfigured parameters. This may not only result in increased decline rates and loss of revenues for the involved entities (e.g., issuer, merchants, and the payment processing network), but can also affect the reputation of the various entities involved in the transaction flow.

Embodiments of the invention can relate to improvements in stand in processing that is performed by an entity such as a payment processing network on behalf of the issuer.

BRIEF SUMMARY

In some cases, an issuer or an issuer processor associated with the issuer may fail to respond to an authorization request entirely, or may respond in a manner that is inconsistent with historical responses over an extended period of time. For example, in some cases, if an issuer experiences a systematic malfunction, it may begin to decline all incoming authorization requests. In such instances, a payment processing network that is situated between the issuer and merchant acquirers may perform stand-in processing for the issuer to make authorization decisions on behalf of the issuer.

Embodiments of the present invention provide systems and methods to detect if an endpoint such as an issuer (or issuer computer) is operating in an abnormal manner. If it is, then stand-in processing may be invoked by an intermediate entity such as a server computer in a payment processing network. The payment processing network may be a switch that resides between a plurality of acquirers and a plurality of issuers.

In embodiments of the invention, in the event of an issuer or an issuer processor outage, new data-driven capabilities in a payment processing network can be utilized to detect a major incident and systematically invoke stand in processing by monitoring issuer volume. Embodiments of the invention can also provide for improved authorization outcomes based on individual users' (e.g., account holders') behavior by using dynamic thresholds.

One embodiment of the invention is directed to a method comprising monitoring, by a server computer, electronic transaction activity associated with a plurality of transactions, wherein the plurality of electronic transactions are processed according to a first set of processing rules at an authorization entity computer of an authorization entity. The method further comprises determining, by the server computer, that the electronic transaction activity from the authorization entity has exceeded a threshold. In some embodiments, a threshold may be statically defined or may vary dynamically. In response to determining that the electronic transaction activity has exceeded a threshold, the method further comprises automatically invoking, by the server computer, a second set of processing rules at the server computer to process subsequent transactions that otherwise would have been authorized or declined by the authorization entity.

Another embodiment of the invention is directed to a server computer comprising a processor and a computer readable medium comprising code, executable by the processor, for implementing a method. The method comprises monitoring electronic transaction activity associated with a plurality of transactions, wherein the plurality of electronic transactions are processed according to a first set of processing rules at an authorization entity computer of an authorization entity. The method further comprises determining that the electronic transaction activity has exceeded a threshold. In response to determining that the electronic transaction activity has exceeded a threshold, the method further comprises automatically invoking a second set of processing rules at the server computer to process subsequent transactions that otherwise would have been authorized or declined by the authorization entity.

Embodiments of the invention are further directed to a system comprising an authorization entity computer associated with an authorization entity, wherein the authorization entity computer comprises a first set of processing rules and a server computer communicatively coupled to the authorization entity computer via a communication network, wherein the server computer comprises a processor and a computer readable medium comprising code, executable by the processor, for implementing a method. The method comprises monitoring, by the server computer, electronic transaction activity associated with a plurality of transactions, wherein the plurality of electronic transactions are processed according to a first set of processing rules at an authorization entity computer of an authorization entity. The method further comprises determining, by the server computer, that the electronic transaction activity has exceeded a threshold. In response to determining that the electronic transaction activity has exceeded a threshold, the method further comprises automatically invoking, by the server computer, a second set of processing rules at the server computer to process subsequent transactions that otherwise would have been authorized or declined by the authorization entity.

These and other embodiments of the invention are described in further detail below.

DETAILED DESCRIPTION

In a typical transaction flow, when a user conducts a transaction with a merchant, an authorization request is forwarded by a merchant computer to an authorization entity via a payment processing network. The authorization entity may be an issuer processor or an issuer (e.g., a bank) with whom the user may have a payment account. The authorization entity may process the authorization request and provide an authorization response back to the merchant indicating if the transaction was approved or declined. In some instances, the authorization entity may fail to respond to the authorization request. For example, the authorization entity may have a systematic malfunction or a connection to the authorization entity may be unavailable. In such instances, the payment processing network or another entity may have to perform stand-in processing to make a decision on behalf of the authorization entity so that a timely authorization response may be provided to the merchant computer for the transaction.

Current solutions to invoke stand-in processing, for example, when an issuer is unavailable or fails to respond in a timely manner, are not completely automated. In some instances, if an issuer experiences a systematic malfunction it may begin to decline 100% of their authorizations. A payment processing network, or other entity may detect such anomalies using network and transaction monitoring tools, but directing all subsequent transactions for that issuer into stand-in processing may require manual processes. Such manual processes may require human intervention, management approvals and can be therefore cumbersome and inefficient.

Some systems use static thresholds for approval rates of an issuer to automatically invoke stand-in processing. For example, stand-in processing may be invoked if the approval rate of the transactions for an issuer falls below 70%. In some instances, a threshold for a timeout period (e.g., waiting period before receiving a response) before stand-in processing can be invoked may be the same for each issuer. For example, a timeout period of 15 seconds may be used as a threshold to invoke stand-in processing for a local issuer (e.g., a United States bank) as well as a foreign issuer (e.g., a bank in Africa). In some instances, the same threshold for the timeout period may be used for the issuers independent of the processing capacity of each issuer, e.g., a number of authorization requests handled by each issuer in a certain time period. For example, some issuers may process up to 1000 authorization requests in a minute, whereas, some smaller issuers may only process up to 100 authorization requests in a minute.

Once stand-in processing is invoked, typical solutions to make authorization decisions on behalf of the issuer are broad based and in most cases may depend upon the issuer's preconfigured parameters. In the absence of optimal configuration parameters provided by the issuers for stand-in processing, use of default setups may lead to higher (than normal or than desired) decline rates for transactions. For example, some of the preconfigured parameters may be based at the BIN (Bank Identification Number), portfolio or product (e.g., credit or debit card) level. As an example, in some instances all debit card transactions may be declined during stand-in processing. As another example, in some instances, authorization decisions during stand-in processing may depend upon different transaction limits assigned to various BIN ranges as pre-configured by the issuer. For example, transactions may be declined during stand-in processing if the transaction amount is over $100 for one set of BINs and over $500 for other set of BINs. Since the configurations provided by the issuer may be static and broad-based that may not be optimal or kept up-to-date, there can be a risk to the issuer and the payment processing network (e.g., if transactions are inappropriately authorized or authorized for inappropriate amounts).

Since a stand-in processing entity such as a payment processing network may not maintain consumer balances or credit limits, determining whether a transaction should be declined due to insufficient account holder funds can be difficult. This can be more important for debit products, where stand-in approval rates may be substantially lower than issuer authorized transactions. Thus, during stand-in processing most of the transactions may be processed using the same stand-in processing rules and thresholds for the consumers due to insufficient information relating to the payment account used for the transaction. For example, a transaction for a consumer who has sufficient balance in his bank account may be declined during stand-in processing as well as a transaction for another consumer who does not have enough balance in his bank account.

In most cases, during stand-in processing, an entity other than the issuer may lack sufficient information to make intelligent authorization decisions and must instead rely on the default customer profiles and static thresholds which may result in more transactions being declined than would otherwise be warranted. Thus, the issuer or the issuer processor outages can not only result in increased declines, dissatisfied users and loss of revenues for the involved entities (e.g., issuer, merchants, and the payment processing network) but can also affect the reputation of the various entities. It is desirable that in the event that an issuer abnormality is detected, and stand-in processing rules are invoked for all of the issuer's transactions, the approval rate during stand-in processing preferably closely matches the issuer's approval rate in order to minimize impact to the payment value chain.

Embodiments of the invention can solve these problems by using data driven capabilities to systematically detect incidents and automatically invoke stand-in processing by monitoring issuer transaction volumes and to further provide improved authorization outcome based on an individual user's profile. Embodiments of the invention provide systems and methods to monitor electronic transaction activity of an issuer or a processor and automatically invoke stand-in processing rules if the activity of the issuer or the processor is abnormal. Embodiments of the invention further provide an improved authorization decision by estimating a fraud risk of authorization of the transaction based on a custom profile associated with individual payment accounts that may be based on dynamic factors.

In some embodiments of the invention, electronic transaction activity associated with a plurality of transactions is monitored by a server computer, wherein the plurality of electronic transactions are processed according to a first set of processing rules at an authorization entity computer of an authorization entity. The server computer may determine that the electronic transaction activity from the authorization entity has exceeded a threshold and in response, may automatically invoke a second set of processing rules to process subsequent transactions that otherwise would have been authorized or declined by the authorization entity.

In some embodiments of the invention, an incident or an outage of a particular issuer can be detected by monitoring the authorization traffic for the issuer. If an indicator of systematic failure is detected for an issuer, such as a significantly decreased approval rate or excessive number of time-outs (e.g., when an authorization response from the issuer is received beyond a normal expected time), stand-in processing can be automatically invoked for all authorizations until the issue is resolved. As issuers' decline rates can vary based on a number of factors, a baseline decline rate and corresponding stand-in processing invocation threshold can be determined. An issuer's authorization volume can be continuously analyzed and thresholds can be adjusted according to the latest transaction data.

Embodiments of the invention provide improved authorization decisions in stand-in processing by shifting away from static BIN-based issuer parameters to a more granular schema that intelligently authorizes transactions based on the account holder's unique spending behavior and experience. This data-driven approach can avoid the issue of improperly configured or non-optimized issuer parameters, and can provide an authorization outcome that is consistent with the individual user's behavior. Embodiments of the invention may be used to model an individual (payment) account's baseline to make customized decisions for a particular account since the entity making decisions on behalf of the issuer during stand-in processing may not have sufficient information relating to the payment account used for the transaction.

Prior to discussing embodiments of the invention, a description of some terms may be helpful in understanding embodiments of the invention.

An "electronic transaction" may include exchange of data and/or information between two entities via electronic means. Electronic means may refer to electronic devices such as computers or communication networks. An electronic transaction may involve a purchase of goods or services by a user from a merchant at a point-of-sale (POS) terminal, a website, via phone, or using any other suitable electronic medium. A transaction may be conducted by a user using a payment account that may be associated with an issuer. The payment account may be linked to a payment card (e.g., credit or debit card), a mobile phone, a digital wallet, etc.

An "activity" may refer to an action or a behavior. For example, an electronic transaction activity may refer to exchange of transaction data between two or more electronic entities. In some embodiments, monitoring electronic transaction activity of an issuer may include monitoring or observing authorization traffic of the issuer, e.g., authorization requests and responses to determine the issuer's behavior. For example, a payment processing network may monitor authorization responses received from an issuer to determine if the issuer is providing authorization responses to authorization requests in a timely manner and in accordance with historical authorization rates.

An "authorization entity" may refer to an entity that is configured to authorize a transaction. For example, an authorization entity may be an issuer or an issuer processor that may receive an authorization request message for a transaction involving purchase of goods and/or services from a merchant. The authorization entity may approve or decline a transaction based on a number of factors such as a credit limit, insufficient funds or fraud risk associated with a payment account used for the transaction. In some embodiments, the authorization entity may authorize or decline a transaction using a set of processing rules.

"Stand-in" may refer to a substitute or in place of. For example, stand-in processing may refer to processing by an entity in place of another entity. In embodiments of the invention, if an authorization entity is malfunctioning, another entity can perform stand-in processing of authorization requests in place of the authorization entity using stand-by processing rules.

"Processing rules" may refer to rules for processing a transaction. In some embodiments, the processing rules may include rules to determine if a transaction can be authorized or not. For example, the processing rules may include fraud rules to determine if the transaction is a legitimate transaction. In some embodiments, some of the processing rules may analyze information associated with a payment account used for the transaction to authorize the transaction. A first set of processing rules may be used by an authorization entity during normal processing of a transaction and a second set of processing rules may be used by an entity other than the authorization entity during stand-in processing when the authorization entity is not available or is malfunctioning. In some embodiments, a first set of processing rules may be more comprehensive than a second set of processing rules.

A "decline rate" may refer to a number of declined transactions in a certain time period. For example, if 5000 transactions were processed in an hour and 4000 of those transactions were declined, the decline rate would be 80%. In some embodiments of the invention, a decline rate threshold may determine if the number of transactions declined by an authorization entity in a certain time period exceeds a certain acceptable value, the authorization entity may be malfunctioning and stand-in processing may need to be invoked.

A "timeout" may refer to absence of an activity for a period of time. For example, an activity may be an authorization response from an authorization entity. In some embodiments, the period of time may be a predetermined value. In some embodiments, a predetermined number of timeouts within a predetermined period of time may indicate an abnormal behavior of an authorization entity and stand-in processing may need to be invoked. In some embodiments, the number of timeouts may not be a static number, but instead may vary dynamically based on the authorization entity's transaction history.

A "threshold" may refer to a transition point. For example, when a value exceeds a threshold a certain action can be taken, and when the value stays equal to or less than the threshold, no action is taken. In some embodiments, a threshold may refer to a lower threshold, such that exceeding the threshold occurs when a monitored value drops below the threshold, causing a corresponding action to be taken, and when the value stays equal to or greater than the threshold, no action is taken. In some embodiments of the invention, multiple thresholds may be defined for the same value, with a first threshold serving as an upper threshold and corresponding to an action to be performed if the value goes above the threshold, and a second threshold serving as a lower threshold and corresponding to a second action to be performed if the value goes below the threshold. In some embodiments, when transaction activity of a plurality of transactions exceeds a threshold, stand-in processing rules may be invoked to authorize a transaction instead of using default rules for normal authorization of transactions. In some embodiments of the invention, a threshold may be determined for a decline rate, a timeout value and/or a change in authorization volume for a plurality of transactions.

As an example, if an authorization entity declines 5 transactions out of every 100 transactions (5% decline rate) in one minute, the decline rate threshold may be 5. If the authorization entity starts declining more than 5 transactions out of 100 transactions over a period of time, then the decline rate may increase. In some embodiments, a threshold may be adjusted based on the latest transaction data. For example, if the authorization entity starts to decline 3 transactions out of every 100 transactions (3% decline rate) in one minute over a period of time, the decline rate threshold may be adjusted to 3. In some embodiments, a threshold may only be adjusted within a high limit and a low limit. In some embodiments, the high limit and the low limit may be the same. For example, if the authorization entity starts declining 6 or more transactions, for example, 8, 9 or 10 transactions per minute over the duration of few hours, the decline rate threshold may be adjusted for up to 10 transactions per minute out of 100 transactions (10% decline rate). However, for more than 10% decline rate, the decline rate threshold may not be adjusted since it may be an indication that the authorization entity is experiencing a systematic malfunction. In this case, stand-in processing may need to be invoked.

In some embodiments, a threshold may correspond to a timeout value which may be adjusted up to a high limit and a low limit. For example, if the threshold is set to 5 time outs in ten hours, the thresholds may be adjusted to have up to 8 time outs in 10 hours before stand-in processing may be invoked.

In some embodiments, a threshold may correspond to a change in predetermined volume of transactions authorized by the authorization entity within a predetermined time period. For example, an acceptable volume of transactions may be a low volume during certain time periods (e.g., mid-night) and a high volume during another time period (e.g., afternoon). If the volume of transactions authorized by the authorization entity changes drastically during those time periods, for example, if there is a high volume of transactions during midnight or a low volume of transactions during the afternoon, it may indicate a change in the predetermined volume of transactions. The corresponding thresholds may be adjusted up to a high limit or a low limit before stand-in processing is invoked.

In some embodiments, a threshold may be set for an approval rate instead of a decline rate. In such cases, the transaction activity of a plurality of transactions may be monitored to determine if the approval rate goes below a certain threshold before stand-in processing may be invoked.

An "authorization request message" may be an electronic message that is sent to a payment processing network and/or an issuer of a payment account to request authorization for a transaction. An authorization request message according to some embodiments may comply with ISO 8583, which is a standard for systems that exchange electronic transaction information associated with a payment made by a consumer using a payment device or payment account. The authorization request message may include an account identifier that may be associated with a payment device or a payment account associated with an issuer. An authorization request message may also comprise additional data elements corresponding to "identification information" including, by way of example only: a service code, a CVV (card verification value), a dCVV (dynamic card verification value), an expiration date, etc. An authorization request message may also include transaction information such as a transaction amount, a merchant identifier, a location of the transaction, a user's name and address, date and time of the transaction, as well as any other information that may be utilized in determining whether to identify and/or authorize a transaction.

An "authorization response message" may be an electronic message reply to an authorization request message generated by an authorization entity or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g. POS equipment) that indicates approval of the transaction. The code may serve as proof of authorization. As noted above, in some embodiments, a payment processing network may generate or forward the authorization response message to the merchant computer.

Figure 1:
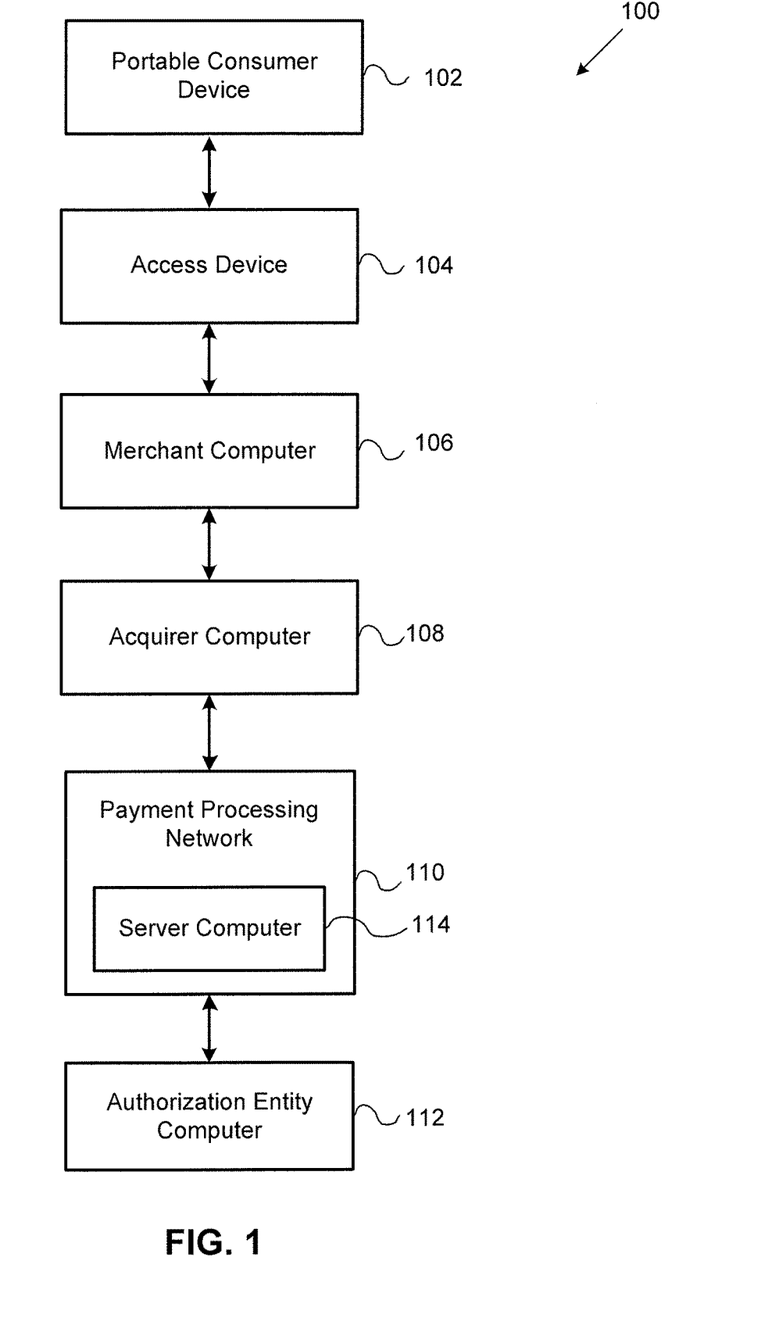
FIG. 1 illustrates a system for processing transactions in one embodiment of the invention.

FIG. 1 illustrates a system 100 for processing transactions according to an embodiment of the invention.

The system 100 may include a portable consumer device 102, an access device 104, a merchant computer 106, an acquirer computer 108, a payment processing network 110 and an authorization entity computer 112. A user (not shown) may use the portable consumer device 102 to conduct a transaction with a merchant. The access device 104 and the merchant computer 106 may be operated by a single merchant. The merchant computer 106 may be in communication with the acquirer computer 108 and the payment processing network 110. The payment processing network 110 may be in communication with the authorization entity computer 112, which may be an issuer or a processor computer. Note that various entities shown in FIG. 1 may communicate with one another using one or more communication networks, which are not shown for the ease of simplicity. The one or more communications networks may be based on any suitable communication protocol such as TCP/IP.

A user may conduct a transaction using the portable consumer device (e.g., a payment card) 102 and an access device (e.g., a POS terminal) 104 that may connect to the merchant server computer 106. The portable consumer device 102 may be any device that may be used to conduct a financial transaction, such as to provide payment information to a merchant. The portable consumer device 102 may be in any suitable form. Some non-limiting examples of the portable consumer device 102 may include payment cards (e.g., credit or debit cards), digital wallets, mobile devices (e.g., mobile phones, notebooks, laptops, tablets, PDAs, etc.), prepaid cards, etc.

The access device 104 may be any suitable device for communicating with the merchant computer 106 and for interacting with the portable consumer device 102. The access device 104 may be a POS device, an mPOS terminal (e.g., a cell phone), a personal computer, an electronic cash register, etc. The access device 104 or the merchant server computer 106 may be configured to generate an authorization request message and forward it to the acquirer computer 108. The authorization request message may include transaction details (e.g., merchandise description, a transaction amount, quantity, a merchant identifier, etc.), payment details (a consumer identifier, a payment account number, expiration date, etc.) and any other suitable information related to the transaction.

The acquirer computer 108 is typically a computer operated by an acquirer. The acquirer may be an entity (e.g., a bank) that has a business relationship with the particular merchant. The acquirer computer 108 may route the authorization request for the transaction to an authorization entity 112 via the payment processing network 110.

The payment processing network 110 may include data processing subsystems, networks, and operations used to support and deliver authorization services, and clearing and settlement services. An example of payment processing network 110 includes VisaNet®, operated by Visa®. The payment processing network 110 may include wired or wireless network, including the internet. The payment processing network 110 may include a server computer 114. The server computer 114 may be configured to monitor electronic transaction activity of a plurality of transactions associated with an authorization entity (e.g., authorization entity computer 112). The server computer 114 may further be configured to analyze the electronic transaction activity data over a period of time to detect if the authorization entity computer 112 is experiencing a systematic malfunction and may provide intelligent authorization decisions on behalf of the authorization entity computer 112.

The authorization entity computer 112 may be a computer that may be operated by an authorization entity such as an issuer (e.g., a bank) or an issuer processor. The issuer may have issued the portable consumer device 102 or a payment account number (or another identifier) used for the transaction.

When a transaction uses a payment account associated with the authorization entity, an authorization request message may be sent to the authorization entity computer 112 via the payment processing network 110. The authorization entity computer 112 may use a first set of processing rules to authorize the transaction. For example, the first set of processing rules may include rules to verify the information associated with the payment account used for the transaction (e.g., a payment account number, expiration date, account balance), the user information (e.g., name, address, phone number, etc.), the merchant information (e.g., merchant category, merchant location) and the transaction information (e.g., a transaction amount, date and time of the transaction). The authorization entity computer 112 may generate an authorization response message including the authorization response. The authorization response message may be sent to the acquirer computer 108 via the payment processing network 110. Once received by the acquirer computer 108, the authorization response message may be sent to the access device 104. If the transaction is approved, the transaction may be completed and the user that conducted the transaction may be notified that the transaction was successfully completed.

When the authorization entity computer 112 does not respond for some reason (e.g., due to a computer malfunction or unavailability of the connection), the payment processing network 110 may invoke stand-in processing rules which may allow the payment processing network 110 or another entity to respond to transactions on behalf of the issuer or issuer processor using a second set of processing rules. This is further explained with reference to FIG. 2.

Figure 2:
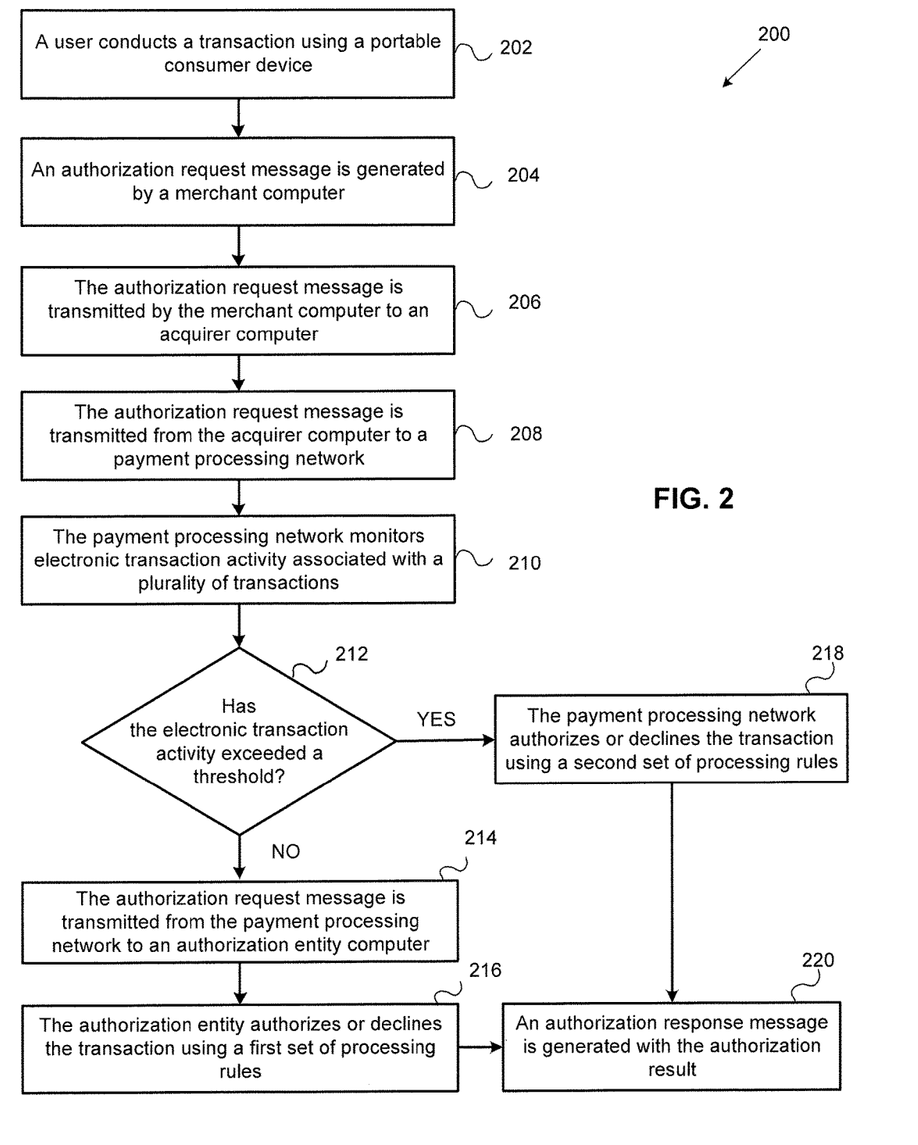
FIG. 2 illustrates a process flow for a method to process a transaction, in one embodiment of the invention.

FIG. 2 illustrates a process flow for a method to process a transaction, in one embodiment of the invention.

In step 202, a user may conduct a transaction using a portable consumer device. As discussed with reference to FIG. 1, a user may use the portable consumer device 102 to conduct a transaction with a merchant using the access device 104. The access device 104 may be coupled to the merchant computer 106. The user may conduct the transaction using a payment account that may be associated with an issuer, e.g., authorization entity computer 112.

In step 204, an authorization request message may be generated by the merchant computer 106. The authorization request message may include transaction information such as a transaction amount, a merchant identifier, date and time of the transaction, a location of the transaction, an account identifier, a user name and address, a phone number and any other relevant information. If the transaction was conducted online, the transaction information may also include an IP address of a user's computer, an email address, etc. An account identifier may be a payment account number, a token, a digital wallet identifier, or any such identifier associated with an issuer.

In step 206, the authorization request message may be transmitted by the merchant computer 106 to the acquirer computer 108.

In step 208, the acquirer computer 108 may forward the authorization request message to the authorization entity 112 via the payment processing network 110.

In step 210, the payment processing network 110 may monitor electronic transaction activity associated with a plurality of transactions. In some embodiments, monitoring the electronic transaction activity may include monitoring activity received from an authorization entity. The payment processing network, or other entity, can use this monitored activity to determine, e.g., decline rates for the plurality of transactions. In some embodiments, monitoring the electronic transaction activity may include monitoring authorization requests sent to an authorization entity and authorization responses received from the authorization entity and calculating the decline rates for the plurality of transactions. In some embodiments, the payment processing network may receive decline rates for one or more authorization entities that were calculated by a third party monitoring service or other entity for the plurality of transactions.

In some embodiments, the payment processing network 110 can set one or more threshold indicators based on the monitored electronic transaction activity. In some embodiments, a threshold indicator may be one field of a data structure. The data structure may include additional fields that may indicate, e.g., how long stand-in processing is to be used (represented as an amount of time or as a number of transactions) and/or which stand-in processing rules are to be used. As the transaction activity is received from the authorization entity, the payment processing network 110 can compare the transaction activity to one or more thresholds. The thresholds may include, e.g., a decline rate threshold, a timeout threshold, a volume threshold based on a number of transactions authorized by the authorization entity within a predetermined time period, or other threshold. If a threshold has been exceeded, the payment processing network can set a corresponding threshold indicator to a value that indicates the threshold has been exceeded. This may cause the payment processing network to automatically apply stand-in processing rules to subsequently received transactions, as described further below.

In some embodiments, a server computer at the payment processing network 110 may aggregate authorization data (e.g., authorization requests and responses) for the plurality of transactions over a predetermined period of time. The server computer may determine a decline rate based on the aggregated authorization data. In some embodiments, a decline rate may be determined by analyzing a number of authorization requests and authorization responses over a period of time. For example, if the authorization entity computer 112 declines 400 transactions out of 5000 transactions processed in one hour, the decline rate is calculated to be 8%. This may indicate that out of 5000 authorization requests processed by the authorization entity computer 112 in one hour, only 400 authorization responses included an authorization code for "transaction declined." In this example, if a decline rate of 8% is greater than the threshold decline rate, then the decline rate threshold indicator can be set to "true."

In some embodiments, the electronic transaction activity may include timeout values associated with the plurality of transactions. For example, whether an authorization entity is experiencing a timeout or an interruption in service may be determined if the authorization entity does not respond to an authorization request message for a transaction in a certain pre-determined time period (e.g., 15 seconds or 30 seconds). In other words, no authorization response message is generated by the authorization entity computer 112 in a certain pre-determined time period. For example, in some instances, a connection to the authorization entity computer 112 may be unavailable or the authorization entity computer 112 may fail to respond due to a systematic malfunction. In some embodiments, a frequency of timeouts may also be determined based on the aggregated timeout values associated with the plurality of transactions. For example, if the authorization entity computer 112 does not respond to 50 authorization requests for every 5000 requests, the time out frequency may be 1%. In some embodiments, a certain time out frequency may be acceptable for each authorization entity for a normal activity level. For example, a normal activity level for a first issuer may correspond to 2 timeouts a day and a normal activity level for a second issuer may correspond to 5 timeouts a day. Similarly, the acceptable response time for each issuer may be different. For example, an acceptable response time for an issuer in the United States may be 15 seconds, while for another issuer in China may be 30 seconds.

In some embodiments, one or more thresholds may be determined dynamically by analyzing the aggregated electronic transaction activity data over a period of time. In some embodiments, the one or more thresholds may correspond to a baseline activity level of an authorization entity. For example, a baseline activity level may correspond to a normal or acceptable behavior of the authorization entity and a significant deviation from the baseline activity level may correspond to a systematic failure of the authorization entity. In some embodiments, the one or more thresholds (or baseline activity level) for different authorization entities may be different. For example, for a first authorization entity a baseline activity level may correspond to a decline rate of 10%, a timeout frequency of 2%, an authorization volume of 5000 transactions per hour and for a second authorization entity it may correspond to a decline rate of 5%, a timeout frequency of 1% and an authorization volume of 3500 transactions per hour. In some other embodiments, the baseline activity level may correspond to certain approval rate, a timeout frequency and an acceptable change in volume of transactions authorized by the authorization entity In some embodiments, thresholds may be dynamic which may change periodically (e.g., every hour or day) or in response to changes in monitored activity. Since the authorization volume processed by each authorization entity may be different at different times of the day, on the weekends or holidays, a threshold corresponding to a change in predetermined volume of transactions authorized by the authorization entity within a predetermined time period may dynamically change. In some embodiments, thresholds may be adjusted periodically (e.g., every hour or day) or on as needed basis. For example, thresholds corresponding to decline rates and number of timeouts may be adjusted based on the latest transaction data. For example, if the decline rates or number of timeouts have changed over few days or weeks, the thresholds may be adjusted accordingly.

In some embodiments, different threshold values may further correspond to various product categories that may be associated with the transaction such as credit, debit or prepaid. For example, a threshold for credit card transactions may be different than the debit card transactions. As an example, a baseline activity level of a first issuer may include about 80% approvals and 20% declines based on the aggregated transaction activity data. Out of the 80% approvals, 60% of those approvals may be for credit cards and 40% of those approvals may be for the debit cards. Similarly, out of the 20% declines, 30% of those declines may be for credit cards and 70% of those declines may be for debit cards.

In step 212, the payment processing network 110 may determine if the monitored electronic transaction activity has exceeded a threshold. This may include checking the threshold indicators to determine if any threshold indicator has been set to "true" or to any other value that may indicate that a threshold has been exceeded and that stand-in processing rules should be used. In some embodiments, a combination of threshold indicators may be required to invoke stand-in processing. For example, if a decline rate threshold indicator and a timeout threshold indicator are both "true" then stand-in processing is invoked.

In step 214, if the electronic transaction activity has not exceeded a threshold or the authorization entity is processing transactions in a normal manner (e.g., close to the baseline), the payment processing network 110 may forward the authorization request message to the authorization entity computer of the authorization entity.

In step 216, the authorization entity may authorize or decline the transaction using a first set of processing rules. In some embodiments, the first set of processing rules may include fraud rules to determine if the transaction is not a fraudulent transaction. For example, the fraud rules may include rules to analyze current transaction data, historical data associated with the user's payment account, user identification data and any other relevant information. The first set of processing rules may also include rules to determine if the user has sufficient funds, credit limit, etc. before authorizing the transaction.

In step 218, if the electronic transaction activity has exceeded a threshold which may indicate that the authorization entity is malfunctioning, the payment processing network 110 may authorize or decline the transaction on behalf of the authorization entity using a second set of processing rules. In some embodiments, the second set of processing rules may be stand-in processing rules. In accordance with embodiments of the invention, the stand-in processing rules may utilize a custom profile for each payment account used in the plurality of transactions. For example, transaction data associated with each payment account may be aggregated over a period of time and a customized profile may be generated for each payment account. In some embodiments, the transaction data associated with each payment account may be aggregated over a period of time by monitoring the electronic transaction activity of a plurality of transactions, as discussed in step 210. This may allow the system to tailor an authorization decision that is customized for a particular account by modeling an individual payment account's baseline. As an account holder's behavior changes over time, the stand-in processing rules 420 can adapt and learn accordingly by monitoring the account holder's payment account.

Some embodiments of the invention implement intelligent data modeling based on several factors that may be used for authorization decisions, such as, insufficient account holder funds, card product type, fraud risk, historical approval rates, etc. However, embodiments of the invention are not limited to these factors. Stand-in processing rules may be based on a combination of these and other factors.

In one embodiment, historical transaction data associated with a payment account may be evaluated to determine an account holder's risk of receiving a decline for insufficient funds. In one embodiment, a combination of an account holder's long term historical data (e.g., 3 months) as well as short term historical data (e.g., 7 days) may be used to provide authorization consistency and to detect recent changes in an account holder's financial situation. In some embodiments, capabilities of an existing risk manager tool may be extended to model the risk of improper account holder declines for various transaction scenarios in near real time using transaction information from a payment system.

In one embodiment, a risk level of a transaction for an individual account holder may be assessed by a fraud detection system during the authorization process. In one embodiment, an account holder's authorization scores can be monitored. Transactions can be declined for a range of scores that represent a significant risk for fraud. Further, the thresholds may be adjusted over time for each account holder to detect statistically significant risk of fraud while limiting false positives, and without needing risk tolerance parameters from the issuer. By declining high risk transactions, account holders can be insulated from fraud, and an issuer's financial risk and chargebacks can be reduced.

In step 220, an authorization response message may be generated with the authorization result. For example, the authorization response message may be generated by the authorization entity during normal processing of the transaction or by the payment processing network in the stand-in processing of the transaction. In some embodiments, an authorization response message may be transmitted to the access device 104 via the acquirer computer 108 and the merchant computer 106.

Figure 3:
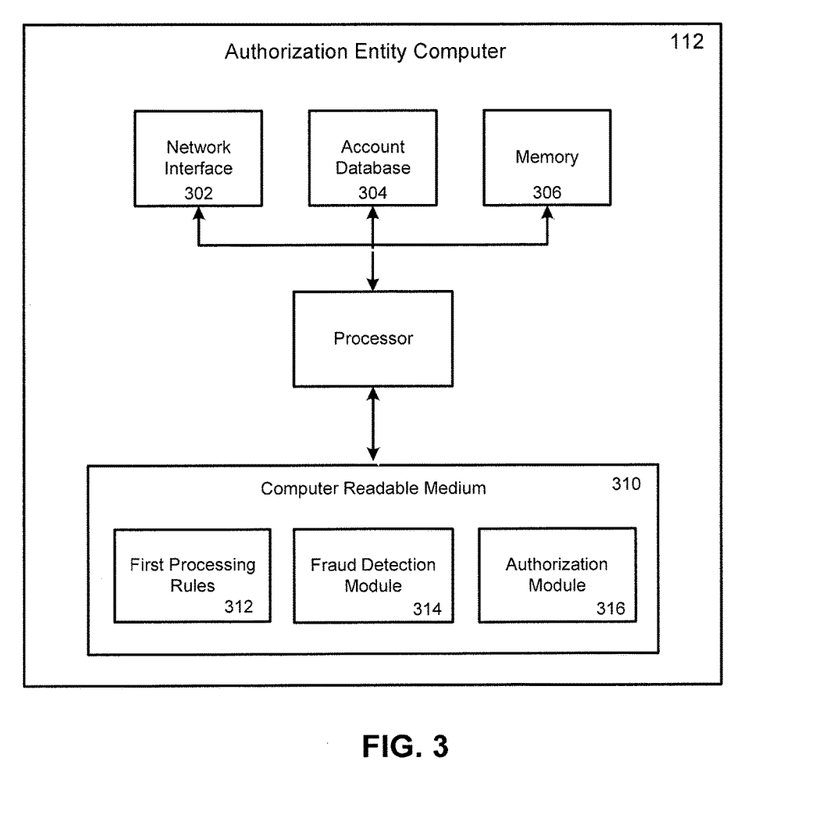
FIG. 3 illustrates a block diagram of an authorization entity computer according to some embodiments of the invention.

FIG. 3 illustrates at least some components of an authorization entity computer according to some embodiments of the invention.

The authorization entity computer 112 may include a network interface 302, an account database 304, a memory 306, a processor 308 and a computer readable medium 310. The authorization entity computer 112 may be associated with an issuer, an issuer processor or another entity configured to authorize transactions.

The network interface 302 may be configured to interface with other entities, such as, the payment processing network 110, acquirer computer 108, merchant computers, etc. for exchange of data and information (e.g., transaction and authorization related data) using various communication networks. A memory 306 may comprise any combination of volatile and/or non-volatile memory such as RAM, DRAM, ROM, flash, or any other suitable memory.

The processor 308 or processing elements may be configured to execute instructions or code in order to implement methods, processes or operations. The computer readable medium 310 may comprise code, executable by the processor 308, for implementing methods using embodiments of the invention. The CRM 310 may comprise first processing rules 312, a fraud detection module 314 and an authorization module 316.

The account database 304 may be externally (e.g., cloud) or internally coupled to the processor 304. The account database 304 may be configured to store account holders' payment account information such as payment account numbers, expiration dates, account balances, credit limits, etc. and account holders' personal identification information such as names, addresses, phone numbers, email addresses, IP addresses, etc. In some embodiments, the account database 304 may also store transaction history associated with each payment account that may be used by the fraud detection module 314 to determine if a transaction is fraudulent or not.

The first processing rules 312 may include rules that may be used by the authorization entity computer 112 to determine if a transaction can be authorized or declined. In some embodiments, the first processing rules 312 may include fraud rules. For example, the fraud detection module 314 may utilize fraud rules to determine if a transaction is fraudulent. The first processing rules 312 may also include rules associated with each product type such as credit, debit, prepaid, etc.

The fraud detection module 314 may be configured to detect if a transaction is fraudulent. For example, the fraud detection module 314 may use fraud rules to determine, for example, if the transaction was conducted by an authorized user using an authorized payment account based on the transaction history associated with the payment account used for the transaction.

The authorization module 316 may be configured to make a decision on whether a transaction can be authorized (e.g., approved) or declined. For example, the authorization module 316 may authorize a transaction based on an input from the fraud detection module, e.g., if the transaction is not fraudulent. Similarly, the authorization module 316 may decline a transaction based on the input from the fraud detection module that the transaction is fraudulent. It will be understood that the transaction can be declined based on other factors such as insufficient account balance, expired account numbers, mismatch of CVV or dCVV, etc.

Figure 4:
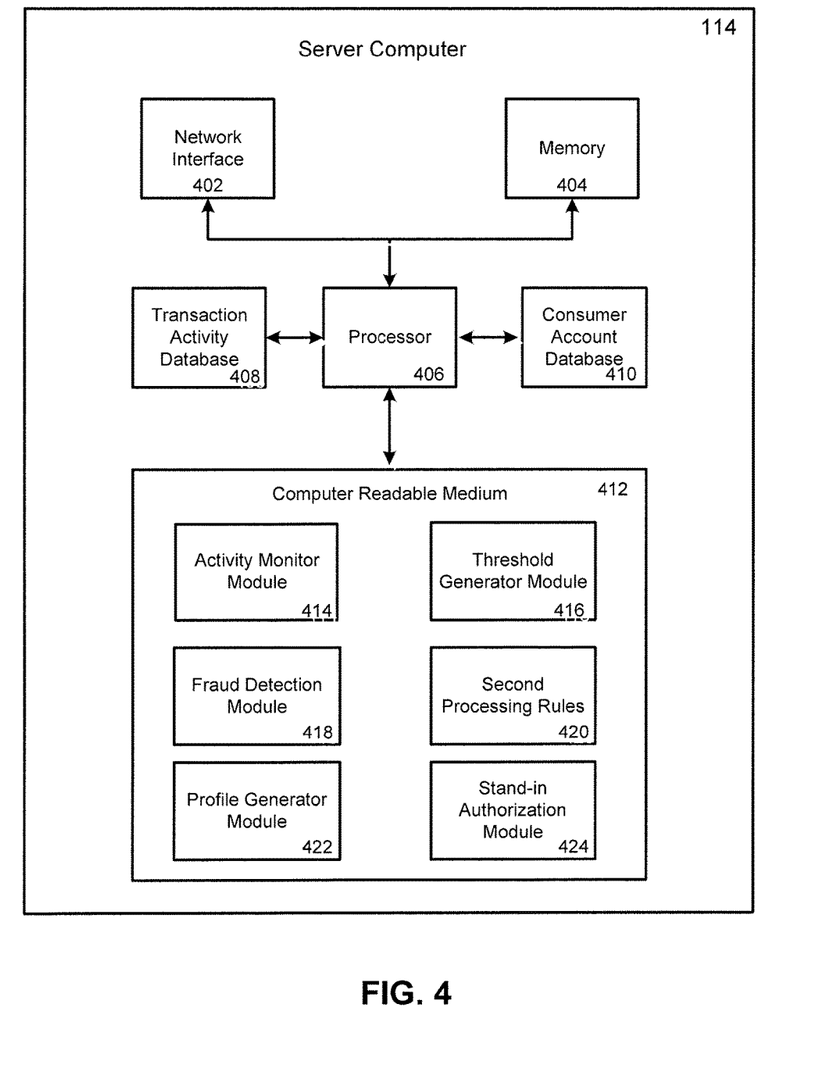
FIG. 4 illustrates a block diagram of a server computer that may be used for implementing embodiments of the invention.

FIG. 4 illustrates at least some components of a server computer that may be used for implementing embodiments of the invention.

The server computer 114 may include a network interface 402, a memory 404, a processor 406, a transaction activity database 408, an account history database 410 and a computer readable medium 412. In some embodiments, the server computer 114 is shown to be part of the payment processing network 110, however, in some other embodiments, the server computer 114 may be part of the merchant computer 106 or the acquirer computer 108.

The server computer 114 may be configured to monitor electronic transaction activity of a plurality of transactions associated with an authorization entity to detect a major incident and provide intelligent authorization decisions on behalf of the authorization entity. A network interface 402 may be configured to interface with other entities, such as, the authorization entity computer 112, acquirer computer 108, merchant computer 106, etc. for exchange of data and information (e.g., transaction and authorization related data) using various communication networks. The memory 404 may comprise any combination of volatile and/or non-volatile memory such as RAM, DRAM, ROM, flash, or any other suitable memory.

The processor 406 or processing elements may be configured to execute instructions or code in order to implement methods, processes or operations. The computer readable medium 412 may comprise code, executable by the processor 406, for implementing methods using embodiments of the invention. The CRM 412 may comprise an activity monitor module 414, a threshold generator module 416, a fraud detection module 418, a custom profile generator module 420, second processing rules 422 and a stand-in authorization module 424.

The processor 406 may further be in communication with the transaction activity database 408 and the account history database 410. In some embodiments, the transaction activity database 408 and/or the account history database 410 may be external to the server computer 114 (e.g., cloud storage). The transaction activity database 408 may store an authorization entity's (e.g., issuer, processor or another entity) transaction activity data over time which may be used to determine a baseline for the authorization entity. The account history database 410 may store historical data associated with different payment accounts which may be used to generate a custom profile for each user such as each user's spending behavior.

The activity monitor module 414 may be configured to monitor transaction activity of a plurality of transactions. For example, the activity monitor module 414 may continuously monitor authorization traffic (e.g., authorization requests and responses) of the authorization entity computer 112. In some embodiments, the activity monitor module 414 may monitor authorization traffic intermittently or periodically. In some embodiments, the transaction activity of a plurality of transactions may be stored in the transaction activity database 408 to determine a baseline behavior of the authorization entity computer 112. In some embodiments, the activity monitor module 414 can set threshold indicators based on the monitored activity from the authorization entity computer, as described above with respect to FIG. 2.

The threshold generator module 416 may be configured to generate one or more thresholds by analyzing the transaction activity data aggregated over a predetermined period of time. In one embodiment, the aggregated transaction activity data is stored in the transaction activity database 408. As discussed previously with reference to FIG. 2, the threshold may correspond to a decline rate threshold, a predetermined number of timeouts within a predetermined period of time, a predetermined volume of transactions authorized by the authorization entity within a predetermined time period or a combination thereof. Also as discussed previously, the threshold may be a dynamic value that can vary over time (e.g., based on the authentication entity's transaction history).

Any significant deviation from any of the thresholds may be an indication that the authorization entity is operating abnormally. Since some of the failure indicators (e.g., decline rate, timeout frequency, authorization volume, etc.) may vary for different authorization entities, corresponding thresholds may be different for invoking stand-in processing for different authorization entities. The authorization traffic for each authorization entity may be continuously analyzed and the thresholds may be dynamically adjusted according to the latest transaction data. For example, the threshold values may be adjusted periodically (e.g., every hour or day) or on as needed basis.

In addition to analyzing some of the indicators of systematic failures, such as, declined approval rates, timeout frequency, and interruption in service, etc., the duration over which these key indicators are occurring can also be taken into account. For example, if an authorization entity's decline rate briefly exceeds the thresholds then comes down to the baseline levels, this may not be an indication of a systematic issue. However, if the key indicators occur over an extended period of time, this could indicate a systematic issue. In some embodiments, duration of the time period may vary for each authorization entity and may be predetermined. In some other embodiments, duration of the time period may be dynamic for each authorization entity, based on the historical data associated with each authorization entity.

The fraud detection module 418 may be configured to detect fraud in a transaction. In some embodiments, the fraud detection module 418 may detect fraud using a first set of fraud rules when the authorization entity is operating normal and the authorization decision is provided by the authorization entity computer 112. In some embodiments, the fraud detection module 418 may detect fraud using a second set of fraud rules when the authorization entity is malfunctioning and the authorization decision is provided by the payment processing network 110 on behalf of the authorization entity computer 112. In some embodiments, accurate authorization decisions may be made by identifying high-risk and potentially fraudulent transactions based on an advanced authorization system, such as the advanced authorization system discussed in the issued U.S. Pat. No. 7,809,650 by the same assignee, which is herein incorporated by reference in its entirety for all purposes.

The custom profile generator module 420 may be configured to generate a custom profile for each payment account used in the plurality of transactions. For example, the custom profile generator module 420 may utilize historical data stored in the account history database 410 for each account to generate each profile. In some embodiments, the historical data may be analyzed to determine patterns such as each user's spending behavior, approval rates, fraud risk, risk of sufficient funds, etc. For example, a user may purchase gasoline for about $40 each week from a particular gas station, or the user may purchase goods or services from a particular online store, or the user may mostly conduct online transactions during certain times of the day, and so on. This may allow the system to tailor an authorization decision that is customized for a particular account by modeling an individual account holder's baseline. As an account holder's behavior changes over time, the custom profile can be updated by monitoring the account holder's account.

One such technique for providing an intelligent estimated amount for authorization is discussed in a published US Patent Application 2012/0036073, which is by the same assignee and is herein incorporated by reference in its entirety for all purposes. As a user's behavior changes over time, capabilities that can learn and adapt can be developed. To accomplish this, intelligent data modeling on several key authorization outcome drivers can be implemented to generate a custom profile. This data-driven approach can avoid the issue of improperly configured or non-optimized issuer parameters, and can provide an authorization outcome that is consistent with the individual user's behavior.

Second processing rules 420 may be used to process the transactions once stand-in processing is invoked. In one embodiment, the authorization decision is based on a custom profile generated by the custom profile generator module 420. The stand-in processing rules 420 can adapt and learn by monitoring the account holder's account over time. In one embodiment, the second processing rules 420 may include fraud rules to determine if the transaction to be processed during stand-in processing is fraudulent.

Stand-in authorization module 424 may be configured to make authorization decisions on behalf of an authorization entity. For example, using the second processing rules 422, the stand-in authorization module 424 may authorize or decline a transaction when the authorization entity computer 112 is malfunctioning or doesn't respond. In some embodiments, the stand-in authorization module 424 may generate an authorization response message that may be transmitted back to the merchant computer 106 via the acquirer computer 108. The authorization response may include a result of the authorization such as an approval or a decline. In some embodiments, the authorization response may also include a reason code which may indicate a reason for the decline of the transaction.

Note that when the authorization entity computer 112 is behaving normally, the server computer 114 may perform the functions of a payment processing network. For example, the server computer 114 may be responsible for providing clearing and settlement services with the acquirer computer 108 and the authorizing entity computer 112.

Embodiments of the invention provide a system and method for improved stand-in processing by monitoring activity of an authorization entity and then taking an automated action in response to changes at the authorization entity. In some embodiments, the stand-in processing may be automated by dynamically analyzing authorization traffic for data, rate of declines, product categories (credit, debit, prepaid, etc.) and sub-categories, interruption service/timeouts/previous issuer volume, etc. In some embodiments, the payment processing network may analyze the transaction data using stand-in processing rules once the stand-in processing is invoked to estimate the risk and provide authorization data based on the customized user profiles. The payment processing network may approve or decline the transaction based on the intelligent estimates.

The various participants and elements described herein with reference to FIG. 1 may operate one or more computer apparatuses to facilitate the functions described herein. Any of the elements in FIG. 1, including any servers or databases, may use any suitable number of subsystems to facilitate the functions described herein.

Figure 5:
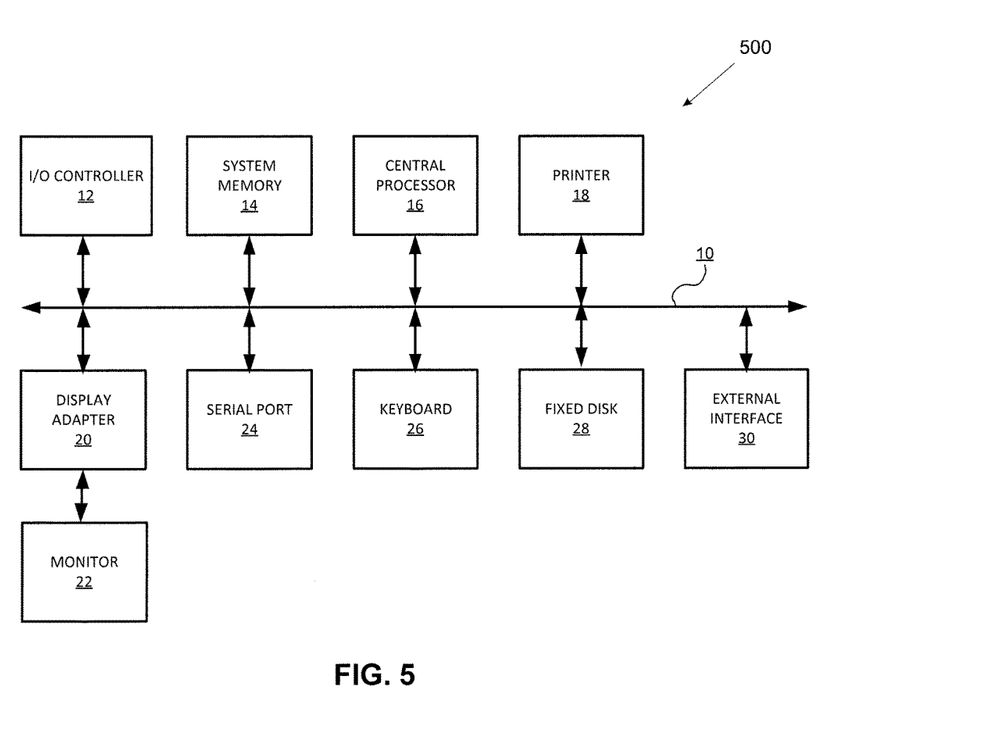
FIG. 5 illustrates a block diagram of a computer apparatus.

Examples of such subsystems or components are shown in FIG. 5. The subsystems shown in FIG. 5 are interconnected via a system bus 10. Additional subsystems such as a printer 18, keyboard 26, fixed disk 28 (or other memory comprising computer readable media), monitor 22, which is coupled to display adapter 20, and others are shown. Peripherals and input/output (I/O) devices, which couple to I/O controller 12 (which can be a processor or other suitable controller), can be connected to the computer system by any number of means known in the art, such as serial port 24. For example, serial port 24 or external interface 30 can be used to connect the computer apparatus to a wide area network such as the Internet, a mouse input device, or a scanner. The interconnection via system bus allows the central processor 16 to communicate with each subsystem and to control the execution of instructions from system memory 14 or the fixed disk 28, as well as the exchange of information between subsystems. The system memory 14 and/or the fixed disk 28 may embody a computer readable medium. In some embodiments, the monitor 22 may be a touch sensitive display screen.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:

receiving, by a transaction processing server computer, a first plurality of authorization request messages from a first plurality of merchant computers for a plurality of transactions;

monitoring, by the transaction processing server computer, a current activity level associated with the plurality of transactions processed according to a first set of processing rules at an issuer entity computer of an issuer entity by:

forwarding, by the transaction processing server computer, the first plurality of authorization request messages to the issuer entity computer such that the issuer entity computer is caused to determine an authorization status for each of the authorization request messages in accordance with the first set of processing rules;

receiving, by the transaction processing server computer, a first plurality of authorization response messages from the issuer entity computer indicating the authorization statuses for each of the authorization request messages; and determining, by the transaction processing server computer, the current activity level associated with the issuer entity based on at least one of a decline rate, a timeout frequency, or an authorization volume determined from the first plurality of authorization request messages, the first plurality of authorization response messages, and the indicated authorization statuses;

calculating, by the transaction processing server computer, a dynamic threshold based upon a baseline activity level of the authorization computer, wherein the baseline activity level is determined based on at least one of a historical decline rate, a historical timeout frequency, or a historical authorization volume;

determining, by the transaction processing server computer, that the current activity level associated with the plurality of transactions has exceeded the dynamic threshold;

in response to determining that the current activity level has exceeded the dynamic threshold, automatically invoking, by the transaction processing server computer, a second set of processing rules at the server computer to process subsequent transactions that otherwise would have been authorized or declined by the issuer entity;

receiving, by the transaction processing server computer, a second plurality of authorization request messages from a second plurality of merchant computers for the subsequent transactions;

determining, by the transaction processing server computer, an authorization status for each of the authorization request messages in accordance with the second set of processing rules;

generating, by the transaction processing server computer, a second plurality of authorization response messages that each include an indication of the authorization status as determined by the transaction processing server computer; and sending, by the transaction processing server computer, the second plurality of authorization response messages to the second plurality of merchant computers.

2. The method of claim 1 wherein the transaction processing server computer is in a payment processing network, and wherein the second set of processing rules are stand-in processing rules that are customized for each payment account used in the plurality of transactions.

3. The method of claim 1, wherein the dynamic threshold is a decline rate threshold, and wherein determining the decline rate threshold comprises:

determining, by the transaction processing server computer, a number of declined transactions from a set of electronic transactions previously processed by the issuer entity computer;

determining, by the transaction processing server computer, the decline rate based on the determined number of declined transactions; and setting, by the transaction processing server computer, the decline rate threshold based on the decline rate.

4. The method of claim 1, wherein the transaction processing server computer is in a payment processing network that is configured to process credit and debit account transactions, and wherein the authorization entity is an issuer.

5. The method of claim 1, wherein the dynamic threshold is a timeout threshold, and wherein determining the timeout threshold comprises:

determining, by the transaction processing server computer, a number of transactions from a set of electronic transactions previously processed by the issuer entity computer for which the issuer entity computer did not provide a response within a predetermined timeout period;

determining, by the transaction processing server computer, the timeout frequency based on the determined number of transactions; and setting, by the transaction processing server computer, the timeout threshold based on the timeout frequency.

6. The method of claim 1, wherein the first set of processing rules comprises a first set of fraud rules, and wherein the second set of processing rules comprises a second set of fraud rules.

7. The method of claim 1, wherein the dynamic threshold is an authorization volume threshold, and wherein determining the authorization volume threshold comprises:

determining, by the transaction processing server computer, a number of authorized transactions from a set of electronic transactions previously processed by the issuer entity computer;

determining, by the transaction processing server computer, the authorization volume based on the determined number of authorized transactions; and setting, by the transaction processing server computer, the authorization volume threshold based on the authorization volume.

8. A transaction processing server computer comprising a processor and a computer readable medium comprising code, executable by the processor, for implementing a method comprising:

receiving a first plurality of authorization request messages from a first plurality of merchant computers for a plurality of transactions;

monitoring a current activity level associated with the plurality of transactions processed according to a first set of processing rules at an issuer entity computer of an issuer entity by:

forwarding the first plurality of authorization request messages to the issuer entity computer;

receiving a first plurality of authorization response messages from the issuer entity computer; and determining, by the transaction processing server computer, the current activity level associated with the issuer entity based on at least one of a decline rate, a timeout frequency, or an authorization volume determined from the first plurality of authorization request messages and the first plurality of authorization response messages;

calculating a dynamic threshold based upon a baseline activity level of the authorization computer, wherein the baseline activity level is determined from at least one of a historic decline rate, a historic timeout frequency, or a historic authorization volume;

determining that the current activity level associated with the plurality of transactions has exceeded the dynamic threshold;

in response to determining that the current activity level has exceeded the dynamic threshold, automatically invoking a second set of processing rules at the transaction processing server computer to process subsequent transactions that otherwise would have been authorized or declined by the issuer entity;

receiving a second plurality of authorization request messages from a second plurality of merchant computers for the subsequent transactions;

generating, using the second set of processing rules, a second plurality of authorization response messages; and sending the second plurality of authorization response messages to the second plurality of merchant computers.

9. The transaction processing server computer of claim 8 wherein the transaction processing server computer is in a payment processing network, and wherein the second set of processing rules are stand-in processing rules that are customized for each payment account used in the plurality of transactions.

10. The transaction processing server computer of claim 8, wherein the dynamic threshold is a decline rate threshold, and wherein determining the decline rate threshold comprises:
   determining a number of declined transactions from a set of electronic transactions previously processed by the issuer entity computer;
   determining the decline rate based on the determined number of declined transactions; and
   setting the decline rate threshold based on the decline rate.

11. The transaction processing server computer of claim 8, wherein the server computer is in a payment processing network that is configured to process credit and debit account transactions.

12. The transaction processing server computer of claim 8, wherein the-dynamic threshold is a timeout threshold, and wherein determining the timeout threshold comprises:
   determining a number of transactions from a set of electronic transactions previously processed by the issuer entity computer for which the issuer entity computer did not provide a response within a predetermined timeout period;
   determining the timeout frequency based on the determined number of transactions; and
   setting the timeout threshold based on the timeout frequency.

13. The transaction processing server computer of claim 8, wherein the first set of processing rules comprises a first set of fraud rules, and wherein the second set of processing rules comprises a second set of fraud rules.

14. The transaction processing server computer of claim 8, wherein the dynamic threshold is an authorization volume threshold, and wherein determining the authorization volume threshold comprises:
   determining a number of authorized transactions from a set of electronic transactions previously processed by the issuer entity computer;
   determining the authorization volume based on the determined number of authorized transactions; and
   setting the authorization volume threshold based on the authorization volume.

15. A system comprising:
   an issuer entity computer associated with an issuer entity, the issuer entity computer comprising a first set of processing rules; and
   a transaction processing server computer communicatively coupled to the issuer entity computer via a communication network, wherein the transaction processing server computer comprises a processor and a computer readable medium comprising code, executable by the processor, for implementing a method comprising:
   receiving a first plurality of authorization request messages from a first plurality of merchant computers for a plurality of transactions;
   monitoring electronic transaction a current activity level associated with the plurality of transactions processed according to the first set of processing rules by:
      forwarding the first plurality of authorization request messages to the authorization entity computer;
      receiving a first plurality of authorization response messages from the authorization entity computer;
      determining, by the transaction processing server computer, the current activity level associated with the issuer entity based on at least one of a decline rate, a timeout frequency, or an authorization volume determined from the first plurality of authorization request messages and the first plurality of authorization response messages;
   calculating a dynamic threshold based upon a baseline activity level of the authorization computer, wherein the baseline activity level is determined based upon at least a historic decline rate, a historic timeout frequency, or a historic authorization volume;
   determining that the current activity level associated with the plurality of transactions has exceeded the dynamic threshold;
   in response to determining that the current activity level has exceeded the dynamic threshold, automatically invoking a second set of processing rules at the server computer to process subsequent transactions that otherwise would have been authorized or declined by the issuer entity;
   receiving a second plurality of authorization request messages from a second plurality of merchant computers for the subsequent transactions;
   generating, using the second set of processing rules, a second plurality of authorization response messages; and
   sending the second plurality of authorization response messages to the second plurality of merchant computers.

16. The system of claim 15, wherein the transaction processing server computer is in a payment processing network configured to process credit and debit account transactions.

17. The system of claim 15, wherein the second set of processing rules are stand-in processing rules that are customized for each payment account used in the plurality of transactions.

18. The system of claim 17, wherein the second set of processing rules is customized based on an account type, historical approval rates, a fraud risk and a risk of insufficient funds associated with the each payment account.

19. The method of claim 1, wherein the dynamic threshold is determined by analyzing a set of electronic transactions previously processed by the issuer entity computer.

20. The method of claim 19, wherein the set of electronic transactions previously processed by the issuer entity computer is associated with a predetermined time period.

* * * * *

UNITED STATES PATENT AND TRADEMARK OFFICE
CERTIFICATE OF CORRECTION

PATENT NO. : 10,282,709 B2
APPLICATION NO. : 14/247032
DATED : May 7, 2019
INVENTOR(S) : Gourab Basu et al.

Page 1 of 1

It is certified that error appears in the above-identified patent and that said Letters Patent is hereby corrected as shown below:

In the Claims

In Column 21, Line 14 please remove "network that is configured" and insert -- network configured --

In Column 22, Line 1 please remove "monitoring electronic transaction a current" and insert -- monitoring a current --

Signed and Sealed this
Twenty-fifth Day of June, 2019

Andrei Iancu
*Director of the United States Patent and Trademark Office*